United States Patent Office 2,923,744
Patented Feb. 2, 1960

2,923,744

PREPARATION OF BIS-2:2-(p-HYDROXYPHENYL) PROPANE

Igor Scriabine and Jacques Paul Marie Bonnart, Lyon, France, assignors to Societe des Usines Chimiques Rhone-Poulenc, Paris, France, a French body No Drawing. Application May 29, 1958
Serial No. 738,641

Claims priority, application France June 3, 1957

2 Claims. (Cl. 260—619)

This invention relates to the production of bis-2:2-(p-hydroxyphenyl)propane.

It is known to prepare bis-2:2-(p-hydroxyphenyl)propane by the action of two molecule equivalents of phenol on one molecular equivalent of acetone in the presence of condensation agents consisting of strong mineral acids such as sulphuric acid or hydrochloric acid.

A very rapid reaction has been obtained by using concentrated sulphuric acid, but the yield, calculated on the acetone, has not exceeded 58.5%. On the other hand, good yields have been obtained by using aqueous sulphuric acid in a concentration of 65-80%, but under these conditions the completion of the reaction takes a long time, ranging from 18 to 27 hours.

If hydrochloric acid in gaseous form or in concentrated aqueous solution is employed, the times necessary for completing the reaction with the same good yields are of the same order of magnitude. However, it has been possible to lower the times considerably, while retaining good yields, by operating in the presence of certain catalysts such as alkyl mercaptans or mercapto-substituted carboxylic acids.

The use of hydrochloric acid, however, gives rise to problems of corrosion which are very difficult and costly to solve in industrial applications, and a process utilising sulphuric acid instead of hydrochloric acid is therefore to be preferred on this account.

In publications describing the use of the aforesaid catalysts, no example has been given of their application in the case of condensation in the presence of sulphuric acid, and tests made by applicants have shown that these catalysts do not give good yields with sulphuric acid.

It is an object of the invention to provid a process wherein sulphuric acid is used but wherein the disadvantages of a long reaction period are minimised.

According to the present invention there is provided a process for the production of bis-2:2-(p-hydroxyphenyl) propane which comprises condensing acetone with phenol in the presence of concentrated sulphuric acid diluted with acetic acid, and in the presence of a mercapto-alkane sulphonic acid or salt or ester thereof as catalyst.

Mercaptoalkanesulphonic acids, such as ω-mercaptoethanesulphonic acid or ω - mercaptopropanesulphonic acid, may be prepared by known methods, for example by the action of sodium hydrosulphide on a sodium chloralkanesulphonate, or by the action of potassium xanthate on a sodium chloralkanesulphonate, followed by treatment with ammonia.

It is unnecessary to use the mercaptoalkanesulphonic acids in the form of pure acids, and it is possible to employ their esters or their salts with different metals. Metals giving insoluble sulphates (e.g. calcium, barium and lead) are preferably avoided however as the resulting insoluble sulphates remain as impurities in the bis-(hydroxyphenyl)propane and require additional purifications. The quantity of catalyst may conveniently vary from 0.1% to 5% of the weight of the charge. A proportion of 0.3% to 1% of the charge generally ensures sufficient acceleration.

The quantity of concentrated sulphuric acid employed for the condensation may vary. It is advantageous to use about 2 mol. thereof per mol. of acetone introduced; with smaller quantities, the reaction is slower and larger quantities do not substantially improve the yields. By the term "concentrated sulphuric acid" is meant acid of at least 85% strength. Commercial sulphuric acid at 66° Bé. (95–96%) is very suitable.

The quantity of acetic acid employed for the dilution of the sulphuric acid may also vary, the most favourable quantity being substantially equal by weight to that of the sulphuric acid. Preferably, glacial acetic acid is employed, but it is not essential for it to be absolutely anhydrous. The acetic acid can readily be recovered at the end of the reaction, for example by extraction with solvents such as ordinary diethyl ether or ethyl acetate.

The molecular ratio of phenol to acetone may vary from the theoretical ratio of 2:1 to 8:1 or more. In practice, a ratio of 5 mol. of phenol to 1 mol. of acetone gives good results. With the ratio of 2:1, the yield calculated on the acetone is smaller. Ratios higher than 5:1 increase the excess of phenol to be recovered without affording any substantial increase in yield of the desired product.

The temperature of the reaction may vary, e.g. between 0° and 50° C., and it is advantageously carried out between 15° C. and 25° C.

Since the condensation reaction is exothermic, the reactants, instead of being mixed together all at once, may be progressively mixed together at a speed depending upon the intensity of the cooling employed to maintain the temperature of the reaction medium within the optimum limits. After the mixing of the reactants, they are left in contact for some time in order to complete the condensation. The duration of the introduction of the reactants may vary from 15 minutes to 1½ hours. The total duration of the reaction does not exceed 2 to 4 hours.

When the condensation is complete, the bis-2:2-(p-hydroxyphenyl)propane is isolated by known means and the acetic acid and the excess of phenol are recovered.

Bis-2:2-(p-hydroxyphenol)propane of excellent quality from the standpoint of colour and melting point is obtained in good yields exceeding 85%, calculated both upon the phenol which has been used up and upon the acetone introduced.

The following examples will serve to illustrate the invention:

Example I 315 g. of glacial acetic acid are introduced into a stainless steel vessel provided with a stirrer, and 300 g. of sulphuric acid at 66° Bé. (95.8%) are run into the vessel with agitation. The mixture is cooled to 15° C. and 3 g. of powdered sodium β-mercaptoethanesulphonate are added. A mixture of 705 g. (7.5 mol.) of phenol and 87 g. (1.5 mol.) of acetone are thereafter run in with agitation and cooling in half an hour, the cooling being so adjusted as to maintain the temperature at 15–17° C. After some time, the bis-2:2-(p-hydroxyphenyl)propane starts to crystallise and the temperature rises to 21–23° C. At the end of the running-in period, which lasts about half an hour, the mixture is further agitated for 1½ hours at 17–18° C. to complete the condensation. The fluid pasty mass obtained is then poured into 4,230 g. of water. The bis-2:2-(p-hydroxyphenyl)propane finally crystallises with a proportion of phenol. It is centrifuged at 30° C. and washed with 500 g. of water at 30° C. The bis-2:2-(p-hydroxyphenyl)propane is again suspended in 2,000 g. of water, the residual acidity is neutralised with 10 g. of sodium acetate, and the product is heated with agitation at 90° C. until the bis-2:2-(p-hydroxyphenyl)propane is liquefied. The product is cooled to 30° C. with agitation, centrifuged and washed with water. The centrifuged bis-2:2-(p-hydroxyphenyl)propane, still containing a little phenol, is freed by steam distillation from the small quantity of phenol which it contains. The product is cooled, centrifuged and dried at 80° C. There is obtained 313 g. of granular white bis-2:2-(p-hydroxyphenyl)propane having a melting point of 151–154° C. The Lovibond colouration of a 5% solution in alcohol is 0.3. The product is free from phenol and has an ash value less than 0.02%. 405 g. of phenol and the acetic acid employed are extracted from the mother liquors by means of ethyl acetate.

The yields are therefore 91.6% calculated on the acetone and 86.1% calculated on the phenol which has been used up.

By recrystallisation from chlorobenzene, there can be obtained a bis-2:2-(p-hydroxyphenyl)propane having a melting point of 155–157° C. in a yield of 95.2%.

*Example II*

The procedure of Example I is followed with a molecular ratio of phenol to acetone of 5:1, but replacing the sodium mercaptoethanesulphonate by sodium ω-mercaptopropanesulphonate. The mixture of phenol and acetone is run in over a period of half an hour at 15° C. The total duration of the reaction is 1½ hours. Bis-2:2-(p-hydroxyphenyl)propane melting at 151–154° C. is obtained in a yield of 86.3% calculated on the acetone and 87% calculated on the phenol which has been used up.

If the sodium ω-mercaptopropanesulphonate is replaced by a mercaptan such as ethylmercaptan, the yields are only 73% calculated on the acetone and 73% calculated on the phenol used up. With isopropylmercaptan, the yields are 52% and 77% calculated on acetone and phenol respectively.

*Example III*

The procedure of Example I is followed but sodium mercaptoethanesulphonate is employed as catalyst and a proportion of phenol and acetone corresponding to the theoretical ratio of 2:1 is employed.

There is obtained a bis-2:2-(p-hydroxyphenyl)propane melting at 145–151° C. in a yield, calculated on the phenol used, of 88.2%, but the yield calculated on the acetone is only 60.5%.

If the sodium mercaptoethanesulphonate is replaced by previously known catalysts, the yields fall to 27.9% in the case of ethylmercaptan, to 9.2% in the case of α-mercaptopropionic acid and to zero in the case of α-mercaptosuccinic acid.

We claim:

1. A process for the production of bis-2:2-(p-hydroxyphenyl)-propane which comprises condensing phenol and acetone together at 0° to 25° C. using a molecular ratio of phenol to acetone of about 2:1 to 5:1 in the presence of a quantity of concentrated sulphuric acid of about twice the molecular equivalent of the acetone present, said sulphuric acid being diluted with about an equal weight of acetic acid, and in the presence of 0.1 to 5% by weight of the reaction mixture of a catalyst selected from the class consisting of mercaptoalkane sulphonic acids and their lower alkyl esters and alkali metal salts.

2. A process for the production of bis-2:2-(p-hydroxyphenyl)propane which comprises condensing phenol and acetone together at 15° to 25° C. using a molecular ratio of phenol to acetone of 2:1 to 5:1 in the presence of a quantity of concentrated sulphuric acid of substantially twice the molecular equivalent of the acetone present, said sulphuric acid being diluted with substantially an equal weight of acetic acid, and in the presence of 0.1 to 5% by weight of the reaction mixture of a catalyst selected from the class consisting of mercaptoalkane sulphonic acids and their lower alkyl esters and alkali metal salts.

References Cited in the file of this patent

UNITED STATES PATENTS

| | | |
|---|---|---|
| 1,986,423 | Arvin | Jan. 1, 1935 |
| 2,359,242 | Perkins et al. | Sept. 26, 1944 |
| 2,468,982 | Jansen | May 3, 1949 |
| 2,515,906 | Stevens et al. | July 18, 1950 |
| 2,730,552 | Williamson | Jan. 10, 1956 |